United States Patent
Kim et al.

(10) Patent No.: US 8,681,682 B2
(45) Date of Patent: Mar. 25, 2014

(54) METHOD AND APPARATUS FOR COOPERATIVE MULTIPLE POINT TRANSMISSION AND RECEPTION

(75) Inventors: Hyung Tae Kim, Anyang-si (KR); Han Byul Seo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 13/321,655

(22) PCT Filed: May 20, 2010

(86) PCT No.: PCT/KR2010/003213
§ 371 (c)(1),
(2), (4) Date: Nov. 21, 2011

(87) PCT Pub. No.: WO2010/134778
PCT Pub. Date: Nov. 25, 2010

(65) Prior Publication Data
US 2012/0069784 A1    Mar. 22, 2012

Related U.S. Application Data

(60) Provisional application No. 61/180,437, filed on May 22, 2009.

(51) Int. Cl.
*H04H 20/71* (2008.01)
*H04W 4/00* (2009.01)
*H04B 7/00* (2006.01)

(52) U.S. Cl.
USPC ........... 370/312; 370/329; 370/331; 455/434; 455/450; 455/501

(58) Field of Classification Search
USPC .......... 370/252, 312, 328, 329, 331; 455/434, 455/446–452.1, 450, 501; 375/227, 67
See application file for complete search history.

(56) References Cited

U.S. PATENT DOCUMENTS

| | | | |
|---|---|---|---|
| 8,498,647 B2 * | 7/2013 | Gorokhov et al. | 455/446 |
| 2008/0132262 A1 | 6/2008 | Jung et al. | |
| 2008/0141079 A1 | 6/2008 | Chindapol et al. | |
| 2008/0175183 A1 | 7/2008 | Devroye et al. | |
| 2009/0111473 A1 | 4/2009 | Tao et al. | |
| 2011/0235608 A1 * | 9/2011 | Koo et al. | 370/329 |
| 2011/0269459 A1 * | 11/2011 | Koo et al. | 455/434 |
| 2011/0286398 A1 * | 11/2011 | Chung et al. | 370/328 |
| 2012/0028665 A1 * | 2/2012 | Kwon et al. | 455/501 |

* cited by examiner

*Primary Examiner* — Afsar M Qureshi
(74) *Attorney, Agent, or Firm* — Birch, Stewart, Kolasch & Birch, LLP (57) ABSTRACT

A cooperative multiple point transmission and reception (CoMP) method of a user equipment (UE) receiving signals from a plurality of base stations (BSs) comprises receiving a first signal from a serving BS, receiving a second signal from an interfering BS, and restoring data, included in the first signal, using the second signal. The second signal comprises a downlink signal, transmitted from the interfering BS to a UE connected to the interfering BS, and a dummy signal for canceling interference of the downlink signal with the first signal. In a wireless communication system composed of multiple cells, CoMP using DPC can be performed even without data sharing between the cells.

9 Claims, 6 Drawing Sheets

□ : Values existing outside the search space for a given constellation $\frac{h_i}{\hat{h}_i}s$, from among the output values of $g(y_i, U, \hat{h}_i, m)$ which can be generated according to an index m value.

■ : Values existing inside the search space for a given constellation $\frac{h_i}{\hat{h}_i}s$ from among output values of $g(y_i, U, \hat{h}_i, m)$ which can be generated according to an index m value.

▨ : search space: Search space for a given $\frac{h_i}{\hat{h}_i}s$

Fig. 9

METHOD AND APPARATUS FOR COOPERATIVE MULTIPLE POINT TRANSMISSION AND RECEPTION

CROSS REFERENCE TO RELATED APPLICATIONS

This application is a National Phase of International Application No. PCT/KR2010/003213 filed on May 20, 2010 which claims the benefit under 35 U.S.C. §119(e) of U.S. Provisional Application No. 61/180,437 filed on May 22, 2009. The entire contents of all of the above applications are hereby incorporated by reference into the present application.

BACKGROUND OF THE INVENTION

1. Field of the Invention

The present invention relates to wireless communication, and more particularly, to a method and apparatus for performing cooperative multiple point transmission and reception (hereinafter referred to as CoMP) in a multi-cell wireless communication system.

2. Related Art

In wireless communication systems, research is recently being done on schemes for improving the performance of a user equipment (hereinafter referred to as UE) placed at the boundaries of a cell. For example, in a wireless communication system having a multi-cell structure, active research is being done on a CoMP technique in which signals are transmitted through inter-cell cooperation. In accordance with the CoMP technique, a UE (in particular, a UE placed at the boundaries of a cell) can have an improved transmission power gain and an improved signal sensitivity through communication with a number of base stations.

The UE placed at the boundaries of the cell does not receive signals from only a serving cell providing services. That is, the UE also receives signals from neighbor cells adjacent to the serving cell (the neighbor cells are hereinafter referred to as interfering cells). A UE within a serving cell may receive a signal which is transmitted from an interfering cell to a UE within the interfering cell. In this case, the signal received from the interfering cell may function as interference with the UE within the serving cell.

In the case in which the number of transmission antennas of a transmitter is one or more, it has been known that a dirty paper coding (DPC) scheme supports a maximum information transmission rate. There is a signal transmission and reception scheme in which in the case in which an interference signal in addition to a noise signal exists in a channel between a transmitter and a receiver, if the transmitter previously knows the interference signal, the receiver is not influenced by the interference signal. An example of the signal transmission and reception scheme is the DPC scheme.

However, the conventional DPC scheme is based on the assumption that a transmitter previously knows an interference signal. As described above, in the CoMP technique, the signals of neighbor cells function as interference signals. Accordingly, to apply the DPC scheme to the CoMP technique, a serving cell and neighbor cells (i.e., interfering cells) must share their data which are transmitted to respective UEs within the cells. To share the data between the cells as described above, a large amount of information needs to be exchanged between the cells, leading to high feedback overhead.

Accordingly, there is a need for a method and apparatus which is capable of performing a CoMP technique using a DPC scheme without sharing data between cells.

SUMMARY OF THE INVENTION

The present invention has been made in view of the above problems, and it is an object of the present invention to provide a method and apparatus which is capable of performing a CoMP using a DPC scheme without data sharing between cells which participate in the CoMP in a wireless communication system including multiple cells.

To achieve the above object, according to an aspect of the present invention, there is provided a cooperative multiple point transmission and reception (CoMP) method of a user equipment (UE) receiving signals from a plurality of base stations (BSs), comprising receiving a first signal from a serving BS, receiving a second signal from an interfering BS, and restoring data, included in the first signal, using the second signal. The second signal comprises a downlink signal, transmitted from the interfering BS to a UE connected to the interfering BS, and a dummy signal for canceling interference of the downlink signal with the first signal.

The data included in the first signal is restored by performing dirty paper coding (DPC) decoding for the first signal using a lattice.

The dummy signal is generated so that the second signal is sent to a lattice point of the lattice for the DPC decoding for the first signal.

Information about the lattice is shared by the serving BS, the interfering BS, and the UE.

The dummy signal is broadcasted by the interfering BS.

According to another aspect of the present invention, there is provided a method of performing CoMP in a wireless communication system, comprising an interfering BS acquiring DPC information of a serving cell and interference channel information, the interfering BS generating a dummy signal which will be sent to a UE placed in the serving cell, based on the DPC information and the interference channel information, and the interfering BS sending a downlink signal to a UE connected to the interfering BS and simultaneously broadcasting the dummy signal. The interference channel information is information about a channel between the interfering BS and the UE placed in the serving cell, and the dummy signal is used to cancel interference of the downlink signal with the UE placed in the serving cell.

The DPC information includes information about a lattice used for DPC encoding of the serving cell.

The dummy signal is combined with the downlink signal to have a same value as one of lattice points of the lattice.

According to yet another aspect of the present invention, there is provided a UE, comprising an RF (Radio Frequency) for transmitting or receiving a radio signal and a processor connected to the RF unit. The processor receives a first signal from a serving BS, receives a second signal from an interfering BS, and restores data, included in the first signal, using the second signal. The second signal comprises a downlink signal, transmitted from the interfering BS to a UE connected to the interfering BS, and a dummy signal for canceling interference of the downlink signal with the first signal.

In accordance with the present invention, a CoMP using a DPC scheme can be performed even without sharing data between cells in a wireless communication system consisting of multiple cells. Accordingly, feedback overhead between cells can be reduced, and so an efficient CoMP can be performed.

BRIEF DESCRIPTION OF THE DRAWINGS

FIG. 7 is a diagram showing the search space of a lattice point for the scaled lattice $$\frac{\hat{h}_i}{h_i}\Lambda_i$$

and a given constellation point s;

FIG. 8 is a diagram showing constellation points $$\frac{h_i}{\hat{h}_i}s,$$

scaled in accordance with a method 3, and the voronoi regions of a scaled lattice $\Lambda_i$.

DESCRIPTION OF EXEMPLARY EMBODIMENTS

Figure 1:
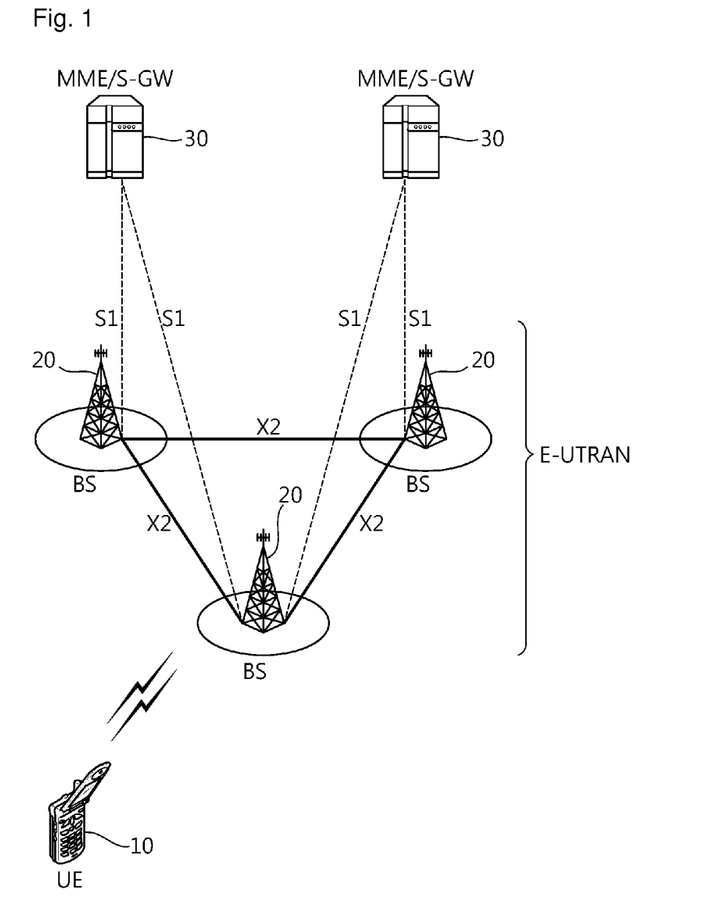
FIG. 1 shows a wireless communication system.

FIG. 1 shows a wireless communication system. The wireless communication system can be a network structure of an E-UMTS (Evolved-Universal Mobile Telecommunications System). The E-UMTS system may also be referred to as an LTE (Long Term Evolution) system. The wireless communication systems are widely deployed to provide various communication services, such as voice and packet data.

Referring to FIG. 1, an E-UTRAN (Evolved-UMTS Terrestrial Radio Access Network) includes BS (base station) 20 providing a control plane and a user plane.

A UE (User Equipment) 10 can be fixed and mobile and can be referred to as another terminology, such as a MS (Mobile Station), a UT (User Terminal), an SS(Subscriber Station), or a wireless device. In general, the BS 20 refers to a fixed station which communicates with the UE 10. The BS 20 can be referred to as another terminology, such as an eNB (evolved-NodeB), a BTS (Base Transceiver System), or an access point. One BS 20 can provide service to at least one cell. The cell is an area in which the BS 20 provides communication services. An interface for user traffic or control traffic transmission may be used between the BSs 20. Hereinafter, downlink refers to communication from the BS 20 to the UE 10, and uplink refers to communication from the UE 10 to the BS 20.

The BSs 20 can be interconnected through an X2 interface. The BS 20 is connected to an EPC (Evolved Packet Core), more particularly, an MME (Mobility Management Entity)/S-GW (Serving Gateway) 30 through an S1 interface. The S1 interface supports a many-to-many-relation between the BS 20 and the MME/S-GW 30.

Figure 2:
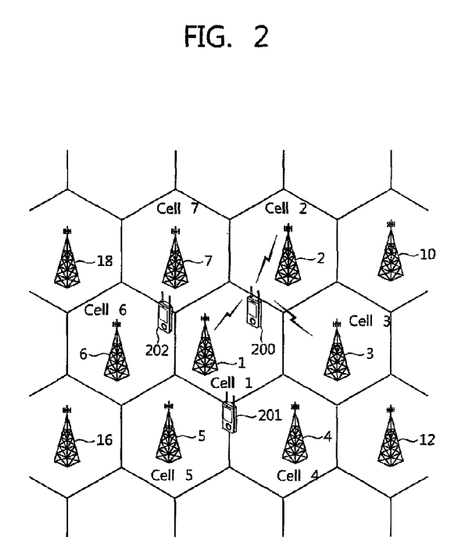
FIG. 2 shows a UE which performs communication in multi-cell environments.

FIG. 2 shows a UE which performs communication in multi-cell environments. As shown in FIG. 2, the UE 200 performs communication with a plurality of BSs placed in different cells.

In general, in a multi-cell communication system, if transmission and reception are performed between a BS and a UE in the state in which the frequency reuse '1' remains intact in the same time and frequency band by not taking other cells into consideration, the throughput of a UE located close to the edge of a cell becomes very deteriorated because of interference from other cells.

To overcome the performance deterioration phenomenon resulting from interference, several schemes had been researched. One of the schemes is a CoMP technique. If the CoMP technique is used, the influence of interference can be effectively cancelled, and so the transmission rate of the entire system can be improved. For example, the UE 200 belongs to a first cell Cell 1. Accordingly, the first cell Cell 1 is a serving cell, and a first BS 1 is a serving BS. If the UE 200 is placed at the boundary of the first cell Cell 1, a second cell Cell 2, and a third cell Cell 3, the UE 200 can be greatly influenced by not only the first BS 1 (i.e., the serving BS), but also a second BS 2 and a third BS 3 (i.e., neighbor BSs). Accordingly, if the first BS 1, the second BS 2, and the third BS 3 cooperatively send data signals to the UE 200, interference signals can be minimized, and so the reception throughput of the UE 200 can be improved.

A DPC scheme can be applied to the CoMP technique. A channel model applied to the DPC scheme and terminologies thereof are first described, and embodiments of the present invention are then described.

Figure 3:
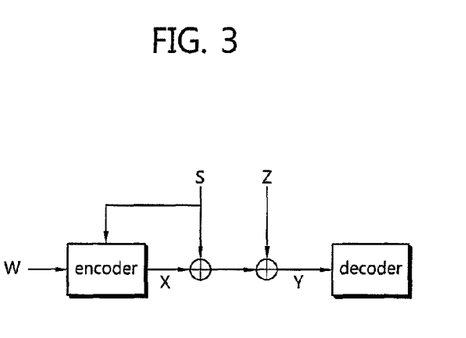
FIG. 3 is a diagram showing a channel model to which a DPC scheme is applied.

FIG. 3 is a diagram showing the channel model to which the DPC scheme is applied.

In FIG. 3, a letter W denotes information which will be transmitted from a BS to a UE, S denotes an interference signal, X denotes a signal produced by encoding the information W, Z denotes a noise signal, and Y denotes a signal received by the UE. Then, Y can be represented by Y=X+S+Z.

Assuming that the BS (i.e., a transmitter) has previously known the interference signal S, the simplest method of canceling the interference signal is to send a difference between the information W and the interference signal S. That is, X=(W−S) is produced and sent. In this case, Y=X+S+Z=(W−S)+S+Z=W+Z. As a result, the UE (i.e., a receiver) can cancel the influence of the interference signal S.

However, if the interference signal S is greater than the information W, the above method is problematic in that the transmitter must consume very high power in order to send the signal X. This is because the power of the signal X becomes E[X2]=E[W2]+E[S2]. In other words, there may be a case in which the transmitter is difficult to meet a power constraint.

Further, when DPS is used in a multi-user environment, the interference signal S can be a signal for a specific user. Accordingly, if the transmitter sends the result X=(W−S), a problem arises because the specific user may not receive his own signal.

To solve the power constraint problem, a modulo operation is used in a DPC scheme.

For example, in the case in which an operation x'=x mod aZ (where a is a predetermined constant and Z is a set of integers) is performed, if the constant a is 2, all even numbers x corresponds to 0, and all odd number x correspond to 1. For all the real numbers x, x' is within (−1, 1]. In the above example, a transmission signal X, produced using the modulo operation and sent by the transmitter, can be X=(W−$\alpha$S−U) mod 2Z. In the above equation, U is a dithering signal, and $\alpha$ is an MMSE scaling factor. The MMSE scaling factor is used for the receiver to minimize the size of effective noise which is generated after a post-processing procedure for DPC decoding is performed.

aZ is a set of all lattices representing a voronoi region. Although, in the above example, aZ is used to denote a specific integer set, it is in general indicated by Λ. In general, when the encoder of the transmitter encodes a signal into X=(W−αS−U) mod Λ and sends the encoding result, the decoder of the receiver can perform decoding using an operation, such as Y'=(αY+U) mod Λ=[W−(1−α)U+Λ] mod Λ. The dithering signal is used to make the signal X and the information W independent and uniformly distribute a set of signals, sent by the transmitter, in a voronoi region irrespective of the statistical characteristic of interference signals. The dithering signal and α need to be known to both the transmitter and the receiver, and the dithering signal may be a random signal having a regular value in a specific section. For convenience of description, α is hereinafter assumed to be 1. The voronoi region is described later.

Figure 4:
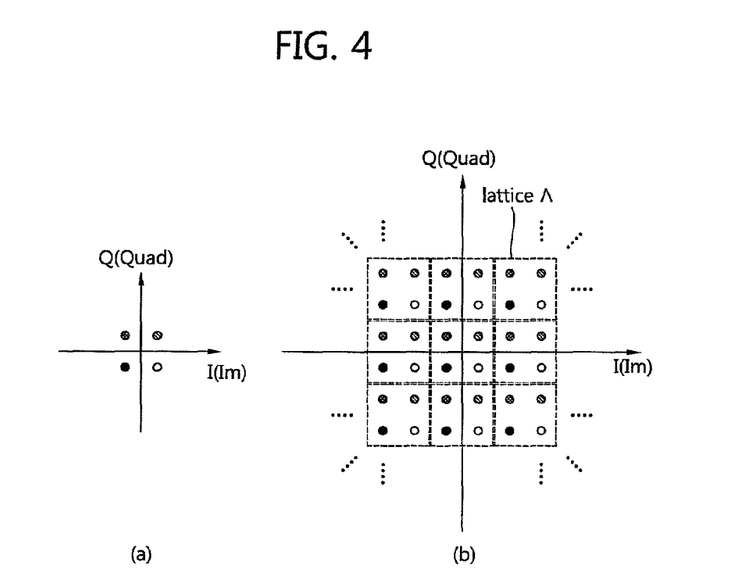
FIG. 4 is a diagram showing a QPSK constellation illustrating the concept of a modulo operation.

FIG. 4 is a diagram showing a QPSK constellation illustrating the concept of a modulo operation.

FIG. 4(a) shows a constellation of common QPSK (quadrature phase shift keying), and FIG. 4(b) shows an extended constellation of a common QPSK constellation.

A transmitter may select a point which is the closest to an interference signal S, from a W constellation duplicated in each of voronoi regions shown in FIG. 4(b), instead of a difference between a signal W to be sent and the interference signal S and may send a difference between the selected point and the interference signal S. In this case, a power constraint can be satisfied for the interference signal S having a arbitrary amount. Here, a modulo operation is used.

The modulo operation used in DPC can be defined using a fundamental voronoi region. A lattice $\Lambda \subset R^n$ forms a discrete subgroup in the Euclidean space. That is, the sum of two given points on the lattice Λ corresponds to a specific point on the lattice. An original point (a 0 vector) is included in the specific point on the lattice. A set of points x (vector values) in an n-dimensional space which is the closest to a specific point λ (a vector value) than all the remaining points on the lattice is referred to as the voronoi region of the point λ. λ is referred to as a representative value of the voronoi region. Here, a voronoi region, having 0 (i.e., the original point) as the representative value, is referred to as the fundamental voronoi region. All the real numbers x (vector values) in Rn can be expressed by x=λ+r, λ∈Λ, r∈v. In the above equation, v denotes the fundamental voronoi region.

The modulo operation used in DPC can be defined using the defined fundamental voronoi region. That is, for all the real numbers x, the region of r=x mod Λ is defined so that it becomes the fundamental voronoi region. x mod Λ=x−λ", and λ" indicates a lattice point which is the closest to x, from among all points included in the lattice Λ (x, r, and λ" are all vector values).

Embodiments of the present invention are described below.

Figure 5:
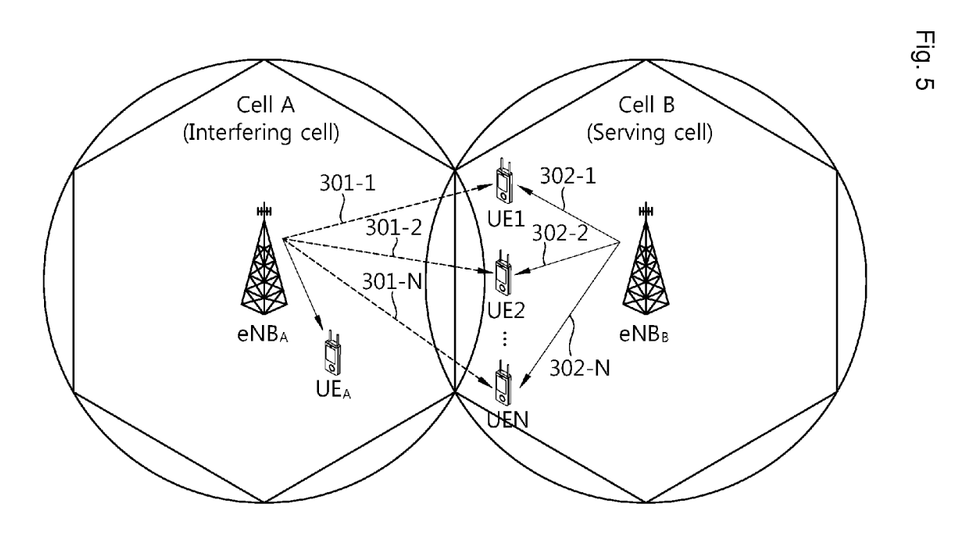
FIG. 5 is a diagram showing a serving cell, an interfering cell, and UEs placed at the boundaries of the serving cell.

FIG. 5 is a diagram showing a serving cell, an interfering cell, and UEs placed at the boundaries of the serving cell.

Referring to FIG. 5, a UE served by a base station eNBA within a cell A is indicated by UEA, and UEs served by a base station eNBB within a cell B are indicated by UE#1, UE#2, . . . , UE#N. The UEA within the cell A may receive nA streams from the base station eNBA. The UEA and UE#i (1≤i≤N, i is a natural number) may use the same time and frequency resources.

The UE#i is placed within the cell B and placed at the boundaries of the cell B. In relation to the UE#i, the cell B is a serving cell and the base station eNBB is a serving BS. A UE placed at the boundaries of a cell is hereinafter referred to as a cell edge UE, for the sake of convenience. A cell edge UE placed within the cell B is subject to Inter-Cell Interference (hereinafter referred to as ICI) from the neighbor cell A. In other words, a signal transmitted by the base station $eNB_A$ within the cell A functions as interference with the cell edge UE. In this sense, the cell A is referred to as an interfering cell and the base station $eNB_A$ is referred to as an interfering BS.

For the sake of convenience, in FIG. 5, it is assumed that there is one UE within the cell A which receives the nA streams using the same time and frequency resources as the UEs within the cell B. However, the present invention is not limited to the one UE, and the number of UEs within the cell A can be 2 or more. Further, it is assumed that each of the UEs within the cell B receives one stream from the base station eNBB. However, the present invention can be applied to a case in which each of the UEs within the cell B receives a plurality of streams.

Figure 6:
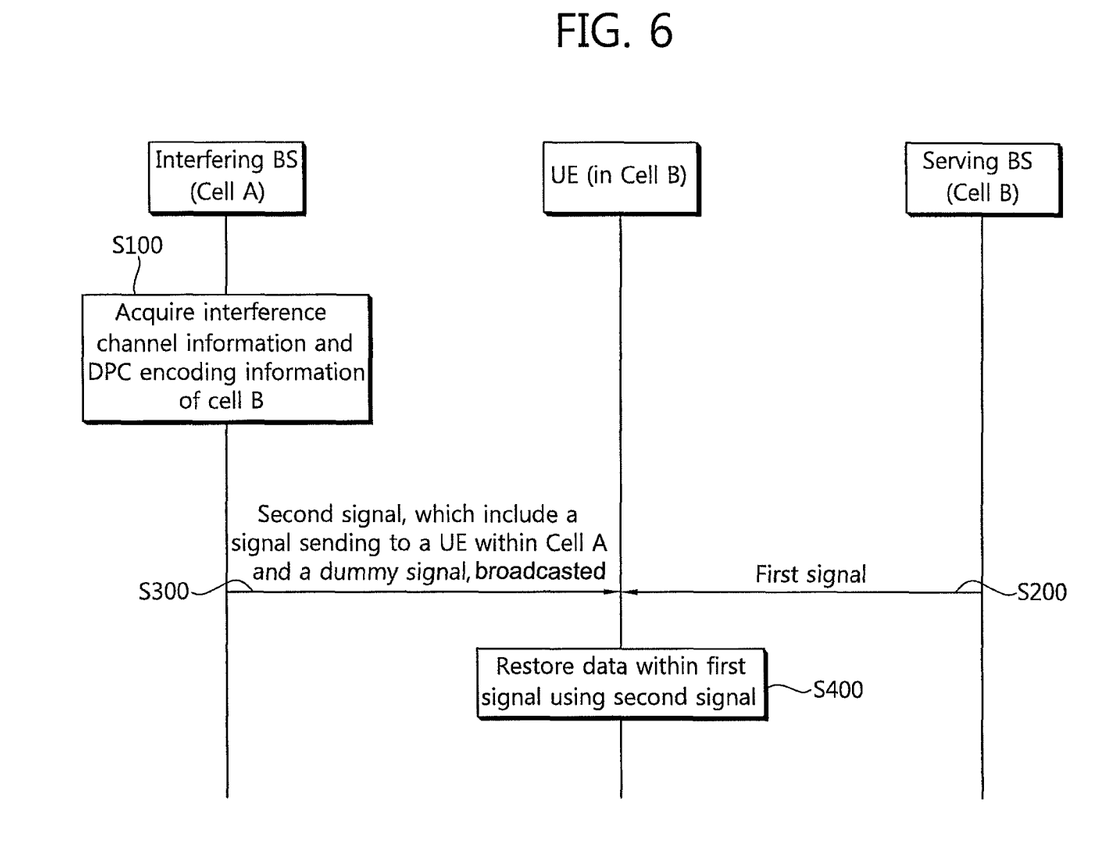
FIG. 6 is a diagram showing a CoMP method according to an embodiment of the present invention.

FIG. 6 is a diagram showing a CoMP method according to an embodiment of the present invention.

An interfering BS acquires interference channel information and DPC encoding information of a serving cell at step S100. Here, the interference channel information is information about a channel between the interfering BS and a cell edge UE within the serving cell. For example, it is assumed that an interfering cell is a cell A, the interfering BS is $eNB_A$, the serving cell is a cell B, a serving BS is $eNB_B$, and a UE#i is the cell edge UE of the cell B. The $eNB_A$ can send a reference signal to the UE#i and receive interference channel information as feedback information.

The DPC encoding information of the serving cell may be, for example, DPC lattice information used in the serving cell. The DPC encoding information may be known to the interfering BS through the exchange of information between the serving BS and the interfering BS or may be a predefined value. That is, the interfering BS can know DPC encoding information, used by the serving BS and the UE within the serving cell, by acquiring the DPC encoding information of the serving cell. Further, the interfering BS can also know DPC decoding information of the serving cell based on the DPC lattice information in that the UE within the serving cell may use the DPC lattice information when performing DPC decoding.

The serving BS transmits a signal to the UE within the serving cell at step S200. The signal transmitted from the serving BS to the UE within the serving cell is referred to as a first signal, for the sake of convenience. The first signal includes data which is sent to the UE within the serving cell. The first signal can be encoded in accordance with a DPC scheme and then transmitted. Here, the first signal may be encoded using the DPC lattice.

The interfering BS sends a signal to a UE within its own cell and, at the same time, additionally broadcasts a dummy signal at step S300. The signal, transmitted from the interfering BS to the UE within its own cell, and the additional dummy signal are referred to as a second signal, for the sake of convenience. Here, the dummy signal is broadcasted by a BS within an interfering cell in order to cancel ICI affecting UEs within a serving cell. The dummy signal may be a signal which has been DPC-encoded using a DPC lattice used in the serving cell.

The cell edge UE of the serving cell receives the first signal and the second signal together and then restores the data within the first signal using the second signal at step S400.

The CoMP method according to the embodiment of the present invention is different from the conventional COMP scheme using DPC in that a serving cell and an interfering cell do not share data. That is, information required by the interfering cell is not information about a transmission signal sent by the serving cell, but the following two pieces of information.

1. Information about an interference channel: channel information about a channel between the interfering cell and the cell edge UE within the serving cell.

2. DPC encoding information of the serving cell: information about a DPC lattice (hereinafter abbreviated as a lattice) of, for example, the serving cell The CoMP method described above with reference to FIG. 6 is described in detail below using equations.

It is hereinafter assumed that a cell A is an interfering cell, a cell B is a serving cell, a UE#i is a cell edge UE of the cell B, and an $eNB_A$ is an interfering BS, and an $eNB_B$ is a serving BS.

A signal received by the UE#i (i.e., the cell edge UE within the cell B) can be expressed by the following equation.

$$y_i = h_i \sum_{j=1}^{N} v_j x_j + \tilde{h}_i \sum_{j=1}^{n_A} \tilde{v}_j \tilde{x}_j + \tilde{h}_i \sum_{j=1}^{N} \hat{v}_j \hat{x}_j + z \quad \text{[Equation 1]}$$

In Equation 1, z denotes a noise signal, nA denotes the number of transmission streams of the cell A (i.e., the interfering cell), and N denotes the number of UEs which exist in the cell B and participate in CoMP. $x_j, \tilde{x}_j, \hat{x}_j$ denote a jth downlink stream from the eNBB (i.e., the serving BS) to a UE#j (i.e., a UE within the serving cell), a jth downlink signal from the eNBA (i.e., the interfering BS) to a UEa (i.e., a UE within the interfering cell), and a jth dummy signal broadcasted by the eNBA (i.e., the interfering BS), respectively. The jth dummy signal is a signal for canceling interference, generated from $\tilde{x}_k|_{k=1,\ldots,n_A}$ and $\hat{x}_k|_{k=1,\ldots,j-1}$, from a signal received by the UE#j (i.e., a UE within the serving cell). $v_j, \tilde{v}_j, \hat{v}_j$ are transmission beamforming vectors for respective $x_j, \tilde{x}_j, \hat{x}_j$. Further, $h_i, \tilde{h}_i$ are an effective channel from the eNBB (i.e., the serving BS) to the UE#i (i.e., the UE within the serving cell) and the effective channel from the eNBA (i.e., the interfering BS) to the UE#i (i.e., a UE within the serving cell). Here, the effective channel refers to a channel after receiver beamforming.

In other words, in Equation 1, the first signal received by the UE#i (i.e., a UE within the serving cell) from the serving BS is expressed by $$h_i \sum_{j=1}^{N} v_j x_j,$$

and the second signal received by the UE#i (i.e., a UE within the serving cell) from the interfering BS is expressed by $$\tilde{h}_i \sum_{j=1}^{n_A} \tilde{v}_j \tilde{x}_j + \tilde{h}_i \sum_{j=1}^{N} \hat{v}_j \hat{x}_j.$$

For convenience of notation, Equation 1 can be written into Equation 2.

$$y_i = h_i v_i x_i + S_i^1 + \tilde{h}_i \hat{v}_i \hat{x}_i + S_i^2 + z' \quad \text{[Equation 2]}$$

In Equation 2, $$z', S_i^1, S_i^2 \text{ denote } z + h_i \sum_{j \neq i}^{N} v_j x_j,$$

$$\tilde{h}_i \sum_{j=1}^{n_A} \tilde{v}_j \tilde{x}_j + \tilde{h}_i \sum_{j=1}^{i-1} \hat{v}_j \hat{x}_j, \text{ and } \tilde{h}_i \sum_{j=i+1}^{N} \hat{v}_j \hat{x}_j, \tilde{h}_i,$$

respectively. Z' is the sum of the noise signal z and an interference signal generated by the serving BS.

In Equation 2, interference denoted by $S_i^2$ can be eliminated. That is, if the interfering BS sets $\hat{v}_j$ to a null direction vector of $\tilde{h}_i$, $S_i^2$ can be eliminated. Such $\hat{v}_j$ may be calculated based on LQ decomposition of an aggregate channel $\tilde{H}=[\tilde{h}_1^H \tilde{h}_2^H \ldots \tilde{h}_N^H]^H$ as follows.

$$\hat{v}_j = q_j^H \quad \text{[Equation 3]}$$

where in relation to a given matrix/vector a, $a^H$ is a Hermitian matrix/vector of the given matrix/vector a. In LQ decomposition, L is a left triangular matrix and Q is a unitary matrix. That is, in Equation 3, in relation to the Q matrix satisfying the aggregate channel $\tilde{H}=LQ$, $q_j$ is a jth row vector of the Q matrix.

If $S_i^2$ is cancelled by transmission beamforming based on the LQ decomposition as in the above method, a signal received by the UE#i is as follows.

$$y_i = h_i x_i + S_i^1 + \hat{h}_i \hat{x}_i + z' \quad \text{[Equation 4]}$$

In Equation 4, $h_i, \hat{h}_i$ denote $h_i v_i$ and $\tilde{h}_i \hat{v}_i$, respectively.

Further, $S_i^1$ stands for a controllable interference signal by taking advantage of $\hat{x}_i$ at the UE.

Hereinafter, how the interfering BS generates the dummy signal $\hat{x}_i$ for eliminating $S_i^1$ is described below.

Method 1

The UE#i receives a signal yi and then performs a post-processing procedure to be described later. The post-processing procedure is a process of the UE#i moving the received signal yi to the fundamental voronoi region of a lattice $\Lambda_i$. Here, in the case in which the sum of a dummy signal sent by the interfering BS and a downlink signal of the interfering BS is placed at a arbitrary lattice point of the lattice $\Lambda_i$, the dummy signal and the downlink signal are eliminated from the received signal yi by a mod $\Lambda$ operation.

Before decoding xi from the received signal yi, the UE performs a post-processing procedure, such as that shown in Equation 5.

$$y_i' = \left(\frac{y_i}{h_i} + U\right) \bmod \Lambda_i \quad \text{[Equation 5]}$$

$$= \left(x_i + \frac{S_i^1 + \hat{h}_i \hat{x}_i}{h_i} + U + \frac{z'}{h_i}\right) \bmod \Lambda_i$$

$$\stackrel{(a)}{=} \left(x_i + \frac{z'}{h_i}\right) \bmod \Lambda_i$$

In Equation 5, $\Lambda_i$ is a lattice for xi. Further, $x \bmod \Lambda_i = x - \lambda_i^n$. $\lambda_i^n$ is an $n^{th}$ lattice point having the shortest distance from the lattice $\Lambda_i$ toward x. Further, U is a dithering signal. The dithering signal U may be known to both the interfering BS $eNB_A$ and the UE#i within the serving cell. The dithering signal U may have a uniform distribution and makes $\hat{x}_i$ have a uniform distribution in the fundamental voronoi region.

In Equation 5, the last equality indicated by (a) is established when $\hat{x}_i$ meets the following condition of Equation 6.

$$\left(\frac{S_i^1 + \hat{h}_i \hat{x}_i}{h_i} + U\right) \bmod \Lambda_i = 0 \quad \text{[Equation 6]}$$

In other words, the UE#i becomes free from ICI caused by the interfering BS eNBA owing to receiving $\hat{x}_i$ satisfying Equation 6 from the interfering BS eNBA. The interfering BS eNBA may generate $\hat{x}_i$ satisfying Equation 7 and transmits the generated $\hat{x}_i$ to the UE#i.

$$\hat{x}_i = h_i \frac{\left(d_{dummy} + \frac{-S_i^1}{h_i} - U\right) \bmod \Lambda_i}{\hat{h}_i} \quad \text{[Equation 7]}$$

In Equation 7, ddummy may be 0. Further, the channel gain ratio $$\left|\frac{h_i}{\hat{h}_i}\right|$$

may be limited to a case in which the channel gain ratio has a value approaching 1. That is, the method 1 may be applied to only a case in which the channel gain ratio $$\left|\frac{h_i}{\hat{h}_i}\right|$$

has a value approaching 1. The reason why the method 1 is applied to only the case as described above is to keep the power constraint of the fundamental voronoi region.

In Equation 7, $S_i^1$ can be known to the interfering BS eNBA. This is because the downlink data of the interfering BS eNBA and the dummy data for the UEs UE#1, UE#2, . . . , UE#(i−1) are encoded before the ith dummy signal $\hat{x}_i$ is generated.

The method of generating the above $\hat{x}_i$ is similar to a conventional DPC encoding process. Accordingly, the method can be easily applied to a case in which the conventional DPC encoding process is used in CoMP. The present invention is different from the conventional DPC encoding process in that the conventional DPC encoding process is performed using known $S_i^1$ and ddummy and then multiplied by $$\frac{h_i}{\hat{h}_i}.$$

As a result, the UE#i receives a DPC encoded stream through the serving channel $h_i$ as if the DPC encoded stream is transmitted by the serving cell not by the interfering cell.

Further, in Equation 5, $$h_i \sum_{j \neq i}^{N} v_j x_j$$

included in Z' (i.e., interference coming from the serving BS eNBB) can be cancelled by applying conventional single cell DPC with LQ decomposition-based beamforming at the serving BS $eNB_B$.

The UE#i can restore the received data by performing decoding for the received data based on $y_i'$ of Equation 5 after removing $S_i^1$ and $\hat{x}_i$ from the received signal $y_i$ through the above-described post-processing procedure.

Method 2

The method 2 according to another embodiment of the present invention is described below. In the above method 1, the transmission signal power of $\hat{x}_i$ may not meet the power constraint because $\hat{x}_i$ depends on the channel gain ratio $$\left|\frac{h_i}{\hat{h}_i}\right|$$

in Equation 7, but the channel gain ratio $$\left|\frac{h_i}{\hat{h}_i}\right|$$

is an uncontrollable value. For example, when the norm of $$\left|\frac{h_i}{\hat{h}_i}\right|$$

is much larger than 1, the transmission signal power of $\hat{x}_i$ may grow higher than the power constraint of the fundamental voronoi region. Accordingly, in the method 2, $\hat{x}_i$ is modified as shown in Equation 8 to guarantee the power constraint.

$$\hat{x}_i = \left(\frac{d_{dummy} - S_i^1}{\hat{h}_i} - U\right) \bmod \Lambda_i \quad \text{[Equation 8]}$$
$$= \frac{d_{dummy} - S_i^1}{\hat{h}_i} - U - \lambda_1^n$$

Further, the post-processing procedure performed before the UE decodes xi from the received signal $y_i$ may be modified as shown in Equation 9.

$$y_i' = \underset{s \in C_i}{\mathrm{argmin}}\left(\min_m \|s - f(y_i, U, h_i, \hat{h}_i, m)\|\right) \quad \text{[Equation 9]}$$

In Equation 9, Ci is the set composed of all constellation points for the ith stream which is transmitted from the serving BS to UEs within the serving cell. s is a constellation point included in Ci. Further, $f(y_i, U, h_i, \hat{h}_i, m)$ is expressed by the following equation.

$$f(y_i, U, h_i, \hat{h}_i, m) = \frac{y_i}{h_i} + \frac{\hat{h}_i}{h_i} U + \frac{\hat{h}_i}{h_i} \lambda_i^m \quad \text{[Equation 10]}$$
$$= x_i + \frac{z'}{h_i} + \frac{S_i^1 + \hat{h}_i \hat{x}_i}{h_i} +$$
$$\frac{\hat{h}_i}{h_i} U + \frac{\hat{h}_i}{h_i} \lambda_i^m$$

-continued $$= x_i + \frac{z'}{h_i} - \frac{\hat{h}_i}{h_i}\lambda_i^n + \frac{\hat{h}_i}{h_i}\lambda_i^m$$

$$= x_i + \frac{z'}{h_i} + \frac{\hat{h}_i}{h_i}(-\lambda_i^n + \lambda_i^m)$$

Figure 7:
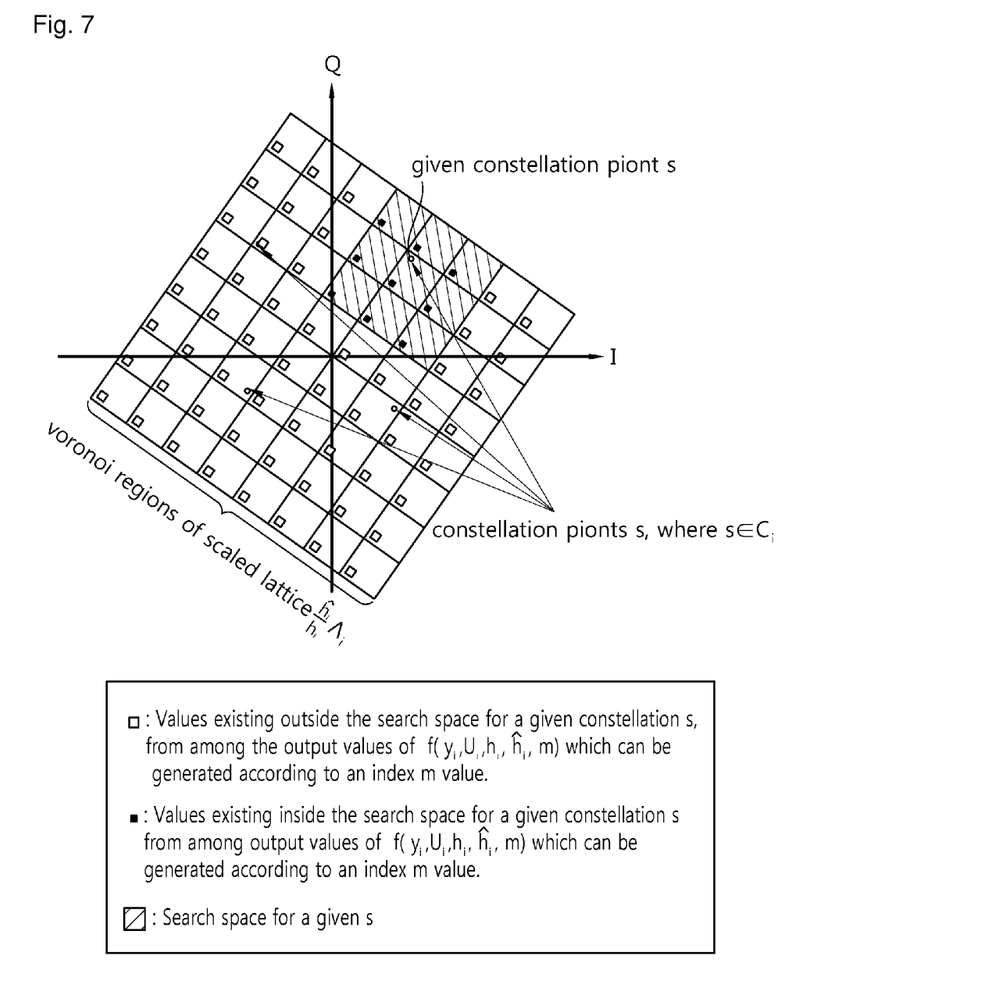

FIG. 7 is a diagram showing the search space of a lattice point for the scaled lattice $$\frac{\hat{h}_i}{h_i}\Lambda_i$$

and a given constellation point s. The function $f(y_i,U,h_i,\hat{h}_i,m)$ in Equation 10 can be copied to all voronoi regions on the scaled lattice $$\frac{\hat{h}_i}{h_i}\Lambda_i$$

depending on an m value as shown in FIG. 7. For a given constellation point s, the search space of the lattice point $\lambda_i^m$ can be reduced to a set of lattice points which bring the function $f(y_i,U,h_i,\hat{h}_i,m)$ to a voronoi region, containing the constellation point s, or voronoi regions around the voronoi region, containing the constellation point s, in the scaled lattice $$\frac{\hat{h}_i}{h_i}\Lambda_i.$$

If DPC is used in the serving cell, the stream $x_i$ transmitted from the serving BS to the UE#i becomes Equation 11 below. That is, the first signal transmitted from the serving BS to the UE within the serving cell may be a signal encoded in accordance with a DPC scheme. The first signal can be expressed by Equation 11 below.

$$\left(w_i - \frac{h_i\sum_{j=1}^{i-1}v_jx_j}{h_i} - U_i\right)\text{mod}\Lambda_i = w_i - \frac{h_i\sum_{j=1}^{i-1}v_jx_j}{h_i} - U_i - \lambda_i^l \quad \text{[Equation 11]}$$

In Equation 11, $w_i$ is data transmitted to the UE#i, and $U_i$ is the dithering signal. The function $f(y_i,U,h_i,\hat{h}_i,m)$ included in Equation 9 can be developed into Equation 12 below.

$$f(y_i, U, h_i, \hat{h}_i, m) = x_i + \frac{z'}{h_i} + \frac{\hat{h}_i}{h_i}(-\lambda_i^n + \lambda_i^m) \quad \text{[Equation 12]}$$

$$= x_i + \frac{h_i\sum_{j=1}^{i-1}v_jx_j + h_i\sum_{j=i+1}^{N}v_jx_j}{h_i} + \frac{z}{h_i} + \frac{\hat{h}_i}{h_i}(-\lambda_i^n + \lambda_i^m)$$

$$\stackrel{(b)}{=} x_i + \frac{h_i\sum_{j=1}^{i-1}v_jx_j}{h_i} + \frac{z}{h_i} + \frac{\hat{h}_i}{h_i}(-\lambda_i^n + \lambda_i^m)$$

$$= x_i + \frac{h_i\sum_{j=1}^{i-1}v_jx_j}{h_i} + \frac{z}{h_i} + \frac{\hat{h}_i}{h_i}(-\lambda_i^n + \lambda_i^m)$$

$$= \left(w_i - \frac{h_i\sum_{j=1}^{i-1}v_jx_j}{h_i} - U_i\right)\text{mod}\Lambda_i +$$

$$\frac{h_i\sum_{j=1}^{i-1}v_jx_j}{h_i} + \frac{z}{h_i} + \frac{\hat{h}_i}{h_i}(-\lambda_i^n + \lambda_i^m)$$

$$= w_i - U_i - \lambda_i^l + \frac{z}{h_i} + \frac{\hat{h}_i}{h_i}(-\lambda_i^n + \lambda_i^m)$$

In Equation 12, an equality (b) can be satisfied in such a manner that the serving BS determines the transmission beamforming vector $v_j$ based on LQ decomposition in a similar way as described in the method 1. Accordingly, Equation 9 can be changed into Equation 13 below.

$$y_i' = \underset{s\in C_i}{\text{argmin}}\left(\underset{m,k}{\min}\|s - U_i + \lambda_i^k - f(y_i, U, h_i, \hat{h}_i, m)\|\right) \quad \text{[Equation 13]}$$

In Equation 13, $\lambda_i^k$ has been introduced to cancel $\lambda_i^l$, which comes from the conventional DPC encoding performed in the cell B (i.e., the serving cell) in order to generated the transmission stream. Further, the search space of the $\lambda_i^k$ can be bounded based on the statistical distribution of $$\frac{h_i\sum_{j=1}^{i-1}v_jx_j}{h_i}$$

After the post-processing procedure is performed, the UE#i decodes the received data based on $y_i'$.

Method 3

The method 3 according to another embodiment of the present invention is described below. In the method 3, the post-processing procedure performed using Equation 9 in the method 2 can be performed by modifying the post-processing procedure as in Equation 14 below.

$$y'_i = \underset{s \in C_i}{\operatorname{argmin}} \left( \underset{m}{\min} \left\| \frac{h_i}{\hat{h}_i} s - g(y_i, U, \hat{h}_i, m) \right\| \right),$$ [Equation 14]

$$g(y_i, U, \hat{h}_i, m) = \frac{y_i}{\hat{h}_i} + U + \lambda_i^m$$

$$= \frac{h_i}{\hat{h}_i} x_i + \frac{z'}{\hat{h}_i} + \frac{S_i^1 + \hat{h}_i \hat{x}_i}{\hat{h}_i} - U + \lambda_i^m$$

$$= \frac{h_i}{\hat{h}_i} x_i + \frac{z'}{\hat{h}_i} - \lambda_i^n + \lambda_i^m$$

In Equation 14, $\hat{x}_i$ is calculated in the same way expressed in Equation 8.

Figure 8:
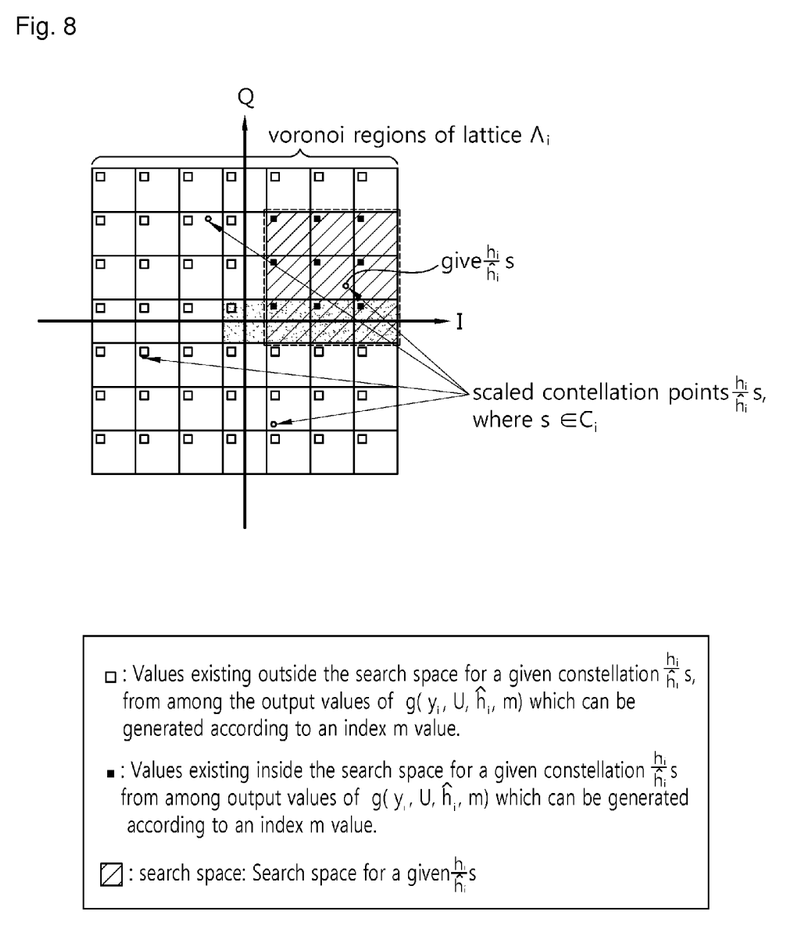

FIG. 8 is a diagram showing of the constellation point $$\frac{h_i}{\hat{h}_i} s$$

scaled in accordance with the method 3 and the voronoi region of the lattice $\lambda_i$.

Referring to FIG. 8, the method 3 differs from the method 2. A difference between the method 3 and the method 2 lies in that in the post-processing procedure, not the lattice, but the constellation point is scaled using $$\frac{h_i}{\hat{h}_i}.$$

After the post-processing procedure, the UE#i decodes the received data based on the $y_i'$.

Figure 9:
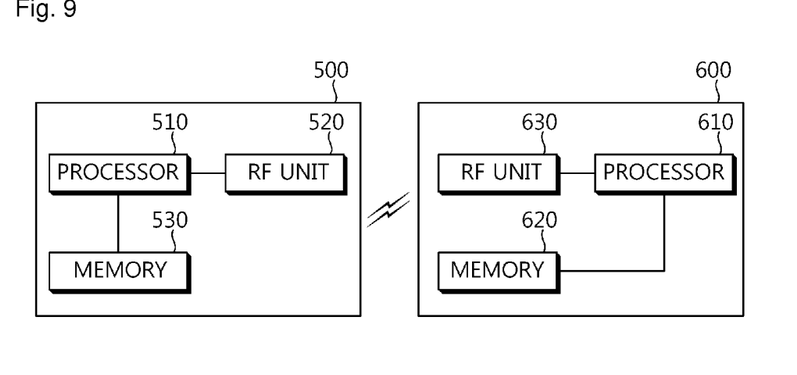
FIG. 9 is a block diagram showing a wireless communication system in which the embodiment of the present invention is implemented.

FIG. 9 is a block diagram showing a wireless communication system in which the embodiment of the present invention is implemented. An interfering BS 500 includes a processor, 510, memory, 530, and an RF (Radio Frequency) unit 520. The procedures, schemes, and functions performed by the interfering BS 500 in the above-described embodiments can be implemented by the processor 510. For example, the processor 510 can generate a dummy signal based on interference channel information, acquired from a UE within a serving cell, and DPC encoding information of the serving cell, acquired from a serving BS, and broadcast the generated dummy signal.

The memory 530 is coupled to the processor 510 and configured to store various pieces of information for driving the processor 510. The RF unit 520 is coupled to the processor 510 and configured to transmit or receive a radio signal.

A UE 600 includes a processor 610, memory 620, and an RF unit 630. The UE 600 may be a UE within the serving cell. The UE 600 receives a first signal from the serving BS and also receives the dummy signal from the interfering BS 500 and a signal (i.e., a second signal) sent to a UE within the interfering cell. The processor 610 decodes data within the first signal using the second signal in accordance with one of the above-described methods 1 to 3.

Each of the processors 510 and 610 can include an ASIC (Application-Specific Integrated Circuit), other chipset, a logic circuit and/or a data processing unit. Each of the memories 520 and 620 can include ROM (Read-Only Memory), RAM (Random Access Memory), flash memory, a memory card, a storage medium and/or other storage device. Each of the RF units 530 and 630 can include a baseband circuit for processing a radio signal. When the embodiments are implemented in software, the above-described scheme can be implemented using a module (process or function) for performing the above function. The module can be stored in the memory 520, 620 and executed by the processor 510, 610. The memory 520, 620 can be internal or external to the processor 510, 610 and coupled to the processor 510, 610 through well-known means.

The embodiments of the present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module that performs the above-described functions. The software can be stored in a memory unit and executed by a processor. The memory unit or the processor can use various means that are well known to those skilled in the art.

While some exemplary embodiments of the invention have been described, it is to be understood that the invention is not limited to the disclosed embodiments, but, on the contrary, is intended to cover various modifications and equivalent arrangements included within the spirit and scope of the appended claims.

The invention claimed is:

1. A cooperative multiple point transmission and reception (CoMP) method of a user equipment (UE) receiving signals from a plurality of base stations (BSS), the CoMP method comprising:
   receiving a first signal from a serving BS;
   receiving a second signal from an interfering BS; and
   restoring data, included in the first signal, using the second signal,
   wherein the second signal comprises a downlink signal, transmitted from the interfering BS to a UE connected to the interfering BS, and a dummy signal for canceling interference of the downlink signal with the first signal.

2. The CoMP method of claim 1, wherein the data included in the first signal is restored by performing dirty paper coding (DPC) decoding for the first signal using a lattice.

3. The CoMP method of claim 2, wherein the dummy signal is generated so that the second signal is sent to a lattice point of the lattice for the DPC decoding for the first signal.

4. The CoMP method of claim 2, wherein information about the lattice is shared by the serving BS, the interfering BS, and the UE.

5. The CoMP method of claim 1, wherein the dummy signal is broadcasted by the interfering BS.

6. A method of performing CoMP in a wireless communication system, comprising:
   an interfering BS acquiring DPC information of a serving cell and interference channel information;
   the interfering BS generating a dummy signal which will be transmitted to a UE placed in the serving cell, based on the DPC information and the interference channel information; and
   the interfering BS transmitting a downlink signal to a UE connected to the interfering BS and simultaneously broadcasting the dummy signal,
   wherein the interference channel information is information about a channel between the interfering BS and the UE placed in the serving cell, and the dummy signal is used to cancel interference of the downlink signal with the UE placed in the serving cell.

7. The method of claim 6, wherein the DPC information includes information about a lattice used for DPC encoding of the serving cell.

8. The method of claim 6, wherein the dummy signal is combined with the downlink signal to have a same value as one of lattice points of the lattice.

9. A UE, comprising:
- an RF (Radio Frequency) unit for transmitting or receiving a radio signal; and
- a processor coupled to the RF unit,
- wherein the processor receives a first signal from a serving BS, receives a second signal from an interfering BS, and restores data, included in the first signal, using the second signal, and
- the second signal comprises a downlink signal, transmitted from the interfering BS to a UE connected to the interfering BS, and a dummy signal for canceling interference of the downlink signal with the first signal.

* * * * *